(12) United States Patent
Van De Sluis et al.

(10) Patent No.: US 11,559,163 B2
(45) Date of Patent: Jan. 24, 2023

(54) SYSTEM AND METHOD FOR THE PREPARATION OF HOT AND COLD BEVERAGES

(71) Applicant: Apiqe Holdings, LLC, Torrance, CA (US)

(72) Inventors: Jasper Jacobus Van De Sluis, Le Utrecht (NL); Mattheus Pieter Both, Ee Apeidoorn (NL)

(73) Assignee: Apiqe Holdings, LLC, Torrance, CA (US)

( * ) Notice: Subject to any disclaimer, the term of this patent is extended or adjusted under 35 U.S.C. 154(b) by 424 days.

(21) Appl. No.: 16/606,616

(22) PCT Filed: Apr. 18, 2018

(86) PCT No.: PCT/NL2018/050243
§ 371 (c)(1),
(2) Date: Oct. 18, 2019

(87) PCT Pub. No.: WO2018/194452
PCT Pub. Date: Oct. 25, 2018

(65) Prior Publication Data
US 2021/0106163 A1    Apr. 15, 2021

(30) Foreign Application Priority Data

Apr. 19, 2017 (NL) ..................................... 2018745

(51) Int. Cl.
*A47J 31/40* (2006.01)
*A47J 31/41* (2006.01)
(Continued)

(52) U.S. Cl.
CPC ............. *A47J 31/407* (2013.01); *A47J 31/41* (2013.01); *A47J 31/46* (2013.01); *A47J 31/4485* (2013.01)

(58) Field of Classification Search
None
See application file for complete search history.

(56) References Cited

U.S. PATENT DOCUMENTS

2015/0125586 A1    5/2015  Ergican
2016/0367069 A1*  12/2016  Cable et al. ............ A47J 31/40

FOREIGN PATENT DOCUMENTS

WO    WO-2007/114685 A1   10/2007
WO    WO 2013164779 A1 *  11/2013 ............. A47J 31/46
(Continued)

OTHER PUBLICATIONS

International Search Report & Written Opinion for PCT/NL2018/050243, dated Sep. 11, 2018, 9 pages.

*Primary Examiner* — Brian W Jennison
*Assistant Examiner* — Kevin Guanhua Wen
(74) *Attorney, Agent, or Firm* — Blank Rome LLP

(57) ABSTRACT

The invention provides a beverage preparation system (1) for the preparation of hot and cold beverages, which system comprises a hot beverage ingredient cartridge (2'), a cold beverage ingredient cartridge (2), and a beverage preparation device (4) adapted to prepare hot and cold beverages. According to the invention, the beverage preparation device (4) comprises a water dispensing manifold (10) for directing hot water and cold water to a dispensing location, the water dispensing manifold (10) comprising a feed lace (11), a cold water conduit (14) and a hot water conduit (16) that ends in a port (20) provided in a wall of the cold water conduit (14). The hot water conduit (16) has a cross section that is smaller than the cross section of the feed lance (11), such that a flow of hot water fed from the hot water conduit (16) into the feed lance (11) via the port (20) passes through part of the cold water conduit (14) and through the feed lance (11) without contacting them.

20 Claims, 6 Drawing Sheets

(51) Int. Cl.
*A47J 31/46* (2006.01)
*A47J 31/44* (2006.01)

(56) References Cited

FOREIGN PATENT DOCUMENTS

| | | | |
|---|---|---|---|
| WO | WO 2015100250 A1 * | 7/2015 | ............ A47J 31/24 |
| WO | WO-2016/081477 A2 | 5/2016 | |
| WO | WO-2016/081480 A2 | 5/2016 | |
| WO | WO 2016081477 A2 * | 5/2016 | ............ B67D 1/00 |
| WO | WO 2016193223 A1 * | 12/2016 | ............ A47J 31/36 |

\* cited by examiner

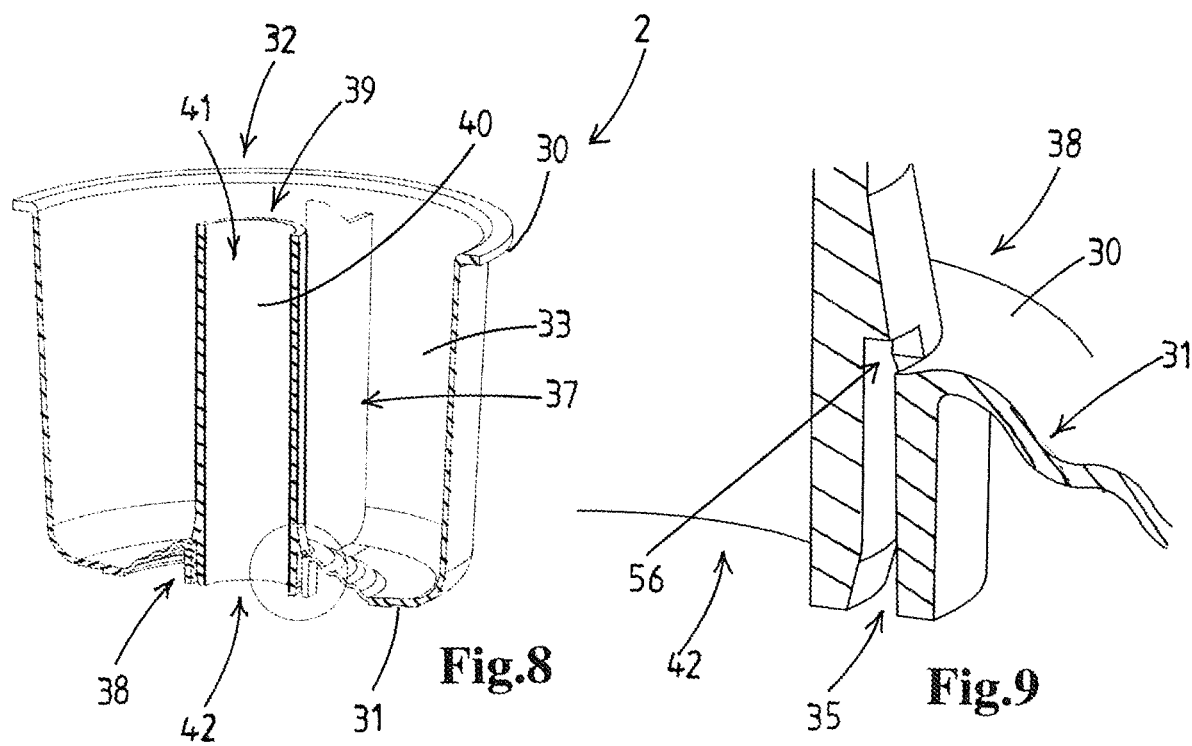
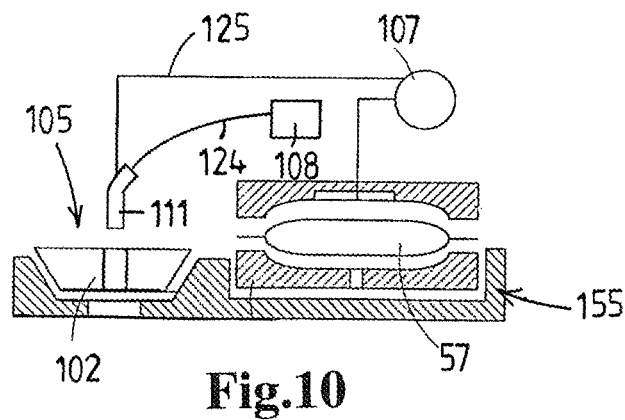
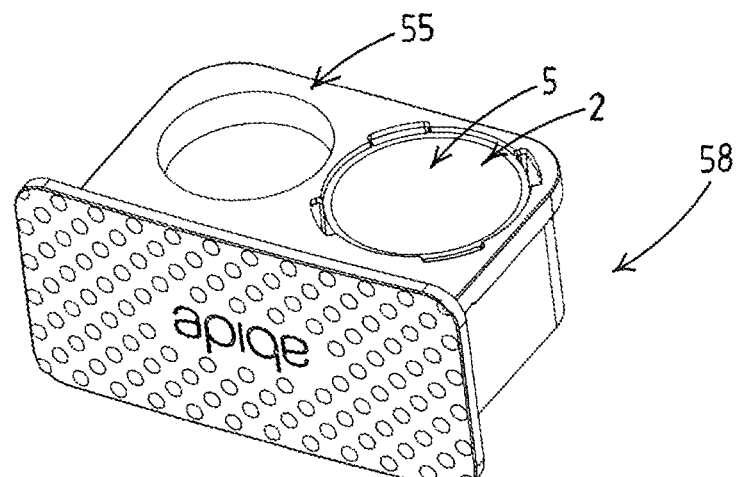

SYSTEM AND METHOD FOR THE PREPARATION OF HOT AND COLD BEVERAGES

RELATED APPLICATIONS

This application is a national phase of PCT/NL2018/050243, filed on Apr. 18, 2019, which claims priority to The Netherlands Patent Application No. 2018745, filed on Apr. 19, 2017 The entire contents of these applications are hereby incorporated by reference.

FIELD AND BACKGROUND OF THE INVENTION

The present invention relates to a beverage preparation system for the preparation of hot and cold beverages, and more in particular, to improvements in beverage preparation devices of such systems, which beverage preparation devices are adapted to selectively dispense hot beverages and cold beverages while utilizing flavouring ingredients including carbonated and non-carbonated water.

Beverage preparation devices have been in use for a long time. However, most preparation devices provide either hot or cold beverages, but not both. Other machines dispense only one type of hot or one type of cold beverage. Thus, for dispensing hot and cold beverages or for providing multiple types of beverage, two or more preparation devices are required, which in turn requires a significant area to set up these devices. Typically, these preparation devices are set up on kitchen counters in homes and in coffee corners in offices, where set up areas are limited.

In addition, it is noted that prior art beverage preparation devices for dispensing hot and cold beverages or utilizing flavouring ingredients typically comprise multiple dedicated dispensing outlets to prevent dispensing of hot beverages from influencing the temperature of a subsequently dispensed cold beverage and vice versa or to prevent residue of a previously dispensed beverage to mix with a subsequently dispensed beverage. The multiple dispensing outlets provide the preparation device with a wide dispensing area, and makes correctly positioning a beverage container for receiving the chosen beverage by the consumer a critical factor.

In order to satisfy the desires of consumers, it is necessary to supply a preparation device for multiple types of beverages, e.g. coffee, hot chocolate, and cold drinks, both carbonated and non-carbonated.

Examples of disposable cartridge based beverage preparation systems are for example disclosed in WO2007/114685, US2015/0125586, WO2016/081477, and WO2016081480, which are incorporated by reference herein.

The present invention relates to a system and to a disposable cartridge filled with a single serve portion of a liquid ingredient to be combined with a base liquid for the preparation of a liquid product, e.g. a liquid food product suitable for human consumption, e.g. a beverage concentrate to be combined with water, e.g. carbonated water, for the preparation of a beverage.

It is a primary object of the invention to provide a beverage preparation system in which the above mentioned drawbacks are eliminated altogether or occur in a greatly reduced extent. In particular, it is an object of this invention to provide an improved beverage preparation device which will selectively dispense hot and cold beverages produced from hot water and/or carbonated water.

It is a further object of this invention to provide a beverage preparation system comprising a compact beverage preparation device capable of alternatingly dispensing hot and cold beverages at the same dispensing location, with minimal variations in the temperature of the hot beverages and the cold beverages dispensed.

It is still another object of this invention to provide a beverage preparation device which is simple in construction and of reduced cost.

It is still another object of this invention to provide a beverage preparation device adapted to selectively dispense hot beverages and cold beverages while utilizing flavouring ingredients including carbonated and non-carbonated water, which beverage preparation device has a small footprint.

SUMMARY OF THE INVENTION

According to the invention, one or more of the above object are achieved by a system according to claim 1.

A beverage preparation system for the preparation of hot and cold beverages according to the invention comprises:

a) a hot beverage ingredient cartridge filled with a single serve portion of a liquid ingredient to be mixed with hot water and a cold beverage ingredient cartridge filled with a single serve portion of a liquid ingredient to be mixed with cold water, wherein for each cartridge:
the cartridge comprises a cartridge body with a bottom and a top, the cartridge body delimiting a reservoir that is filled with the liquid ingredient,
the cartridge body at the bottom has one or more dispensing passages in communication with the reservoir and adapted to dispense the liquid ingredient at the bottom side of the cartridge, and
the cartridge body comprises a column that has a bottom end at the bottom of the cartridge body and a top end at the top of the cartridge body, and has a channel that extends through the column from a channel inlet aperture at the top end of the column to a channel outlet aperture at the bottom end of the column, b) a beverage preparation device adapted to prepare hot and cold beverages, the apparatus comprising:
   a holder configured to support one of said hot and cold beverage cartridges in a dispensing position with the channel of the column in an upright position, at a dispensing location in the preparation device;
   optionally, a support, preferably comprising a drip tray, for supporting a beverage container, in which the hot or cold beverage is to be received, below the holder;
   a hot water source;
   a cold water source;
   optionally, a carbonator;
   a water feed assembly comprising a water dispensing manifold, located above the holder, for directing the hot water from the hot water source and the cold water from the cold water source to the dispensing location, wherein the water dispensing manifold comprises:
   a feed lance, which feed lance is embodied as a channel section having a linear central axis that extends in a vertical direction, and which feed lance at a lower end thereof has a dispensing opening for dispensing the hot water and the cold water in a vertical dispensing direction;
   a cold water conduit, which cold water conduit is, via a cold water supply line, connected to the cold water source, and which cold water conduit is embodied as a channel section having a curved central axis, the curvature of the central axis preferably being tangent to the linear central axis of the channel section of the feed lance, for guiding a flow of cold water into the vertical dispensing direction;

a hot water conduit, connected via a hot water supply line to the hot water source, which hot water conduit is embodied as a channel section having a linear central axis that extends parallel to, preferably coincides with, the linear central axis of the channel section of the feed lance, wherein the hot water conduit ends, at a lower end thereof, in a port provided in a wall of the cold water conduit for dispensing a flow of hot water via the cold water conduit into the feed lance, wherein, when the hot beverage ingredient cartridge or the cold beverage ingredient cartridge is supported in the dispensing position, the feed lance of the water feed assembly is aligned with the channel in the column of the respective cartridge and the channel of said hot and cold beverage ingredient cartridge form a vertical extension of the feed lance, and wherein the hot water conduit has a cross section that is smaller than the cross section of the feed lance and preferably is smaller than the cross section of the channel in the column of the hot beverage ingredient cartridge, such that a flow of hot water, that is fed from the hot water conduit into the feed lance via the port, passes through part of the cold water conduit and through the feed lance without contacting the cold water conduit or the feed lance and preferably passes through the hot beverage cartridge without contacting the cartridge.

A beverage preparation system in accordance with this invention includes a hot and cold beverage preparation device for selective preparation of hot and cold beverages. By providing the beverage preparation device with a water feed assembly comprising a water dispensing manifold according to the invention, the invention enables providing hot and cold water via the same feed lance, with minimal temperature interference between the two flows.

Because the hot water is dispensed through the centre of feed lance, more in particular via a centre of a channel section of the feed lance, it can be delivered at the same location as the cold water flow dispensed via the feed lance. This allows for the beverage preparation device to have a single, narrow dispensing area, and makes correctly positioning a beverage container for receiving the chosen beverage by the consumer less critical.

Furthermore, because the hot water flow is dispensed at the same location as the cold water flow dispensed via the feed lance, the hot beverage ingredient cartridge and the cold beverage ingredient cartridge can be similar, interchangeable cartridges, adapted to be used with the same holder and the same water feed manifold, and more in particular can be adapted to be engaged by the same feed lance.

The hot water flow does not contact the walls of the feed lance. Thus the hot water will not warm the feed lance, more in particular not warm the surface of the channel section of the feed lance, and thus the will not warm a flow of cold water subsequently being dispensed through the feed lance.

Also, it is noted that cold water being dispensed does contact the feed lance, more in particular the surface of the channel section of the feed lance, and thus cools that surface. However, because the hot water flow does not contact the feed lance, this cooling will be of no, or only minimally, influence on the temperature of a hot water flow subsequently dispensed. Thus, the feed lance can be used to define the cross section of the flow of cold water dispensed.

Dispensing a flow of cold water along the sides of the channel of the cold beverage ingredient cartridge is in particular beneficial when dispensing carbonated water, which preferably is dispensed in a laminar flow, more in particular a flow with a minimum of disturbance, e.g. turbulence, of said flow.

Thus, a beverage preparation device according to the invention is able to provide alternatingly hot drinks and cold drinks, using interchangeable hot beverage ingredient cartridges and cold beverage ingredient cartridges in a single holder, with minimal variations in temperature of the water provided, and thus with hot drinks at a substantially similar temperature and cold drinks of a substantially temperature.

It is submitted that temperature is a critical factor in the experience of drinks, in particular with flavoured carbonated beverages. Small changes in temperature may already be of influence in the taste experienced by a consumer. Control of the water temperature, and thus of the beverage temperature, is therefore a critical component in providing high quality beverages.

In addition, it has been found that the low turbulence in, and a low temperature of, the water enhances the $CO_2$ content of the water. It is therefore submitted that the water dispensing manifold according to the invention is especially beneficial when used in a beverage preparation device adapted to provide beverages comprising carbonated water.

It is known in the prior art to use beverage preparation devices in combination with cartridges pouches etc. for preparing a beverage. Many types of ingredients are used. It is submitted that the beverage preparation device according to the invention allows for preparing known types of instant beverages, e.g. soft drinks, hot chocolate, etc. Furthermore, the cartridges can be used with typical beverages ingredients known in the prior art.

It is submitted that the hot beverage ingredient and the cold liquid ingredient preferably are liquid ingredients that can be dispensed as a flow from the cartridge. In an embodiment, the liquid ingredient is a beverage concentrate, for example a syrup or condensed milk. In an embodiment, the reservoir of the cartridge is provided with solid beverage ingredients, e.g. sugar or ground coffee, to be at least partially dissolved or extracted by water guided through the reservoir.

The beverage preparation device is in particular suitable for providing both hot beverages and cold beverages, in particular carbonated cold beverages. The configuration of the water dispensing manifold enables for dispensing hot water and cold water via the same feed lance, but also allows for dispensing the cold water via the manifold with generating minimal turbulence in the flow of cold water. In combination with the minimal temperature interference of hot beverages dispensed via the manifold, this makes the manifold in particular suitable for dispensing carbonated water.

When dispensing carbonated water, it is always difficult to obtain $CO_2$ content similar to the $CO_2$ content of bottled carbonated beverages. It has been found that dispensing the water at a low temperature and with a minimum of disturbance of the flow of cold water, is beneficial for the $CO_2$ content of the water dispensed.

In an embodiment, the cross section of the channel in the column of the beverage ingredient cartridges, or at least a downstream part of that channel, is identical to the cross section of the feed lance. Thus, a substantially continuous channel is provided, i.e. a channel having a substantially continuous cross section, which allows for a laminar flow and thus is optimal for dispensing carbonated water.

Dispensing a flow of cold carbonated water along the sides of the channel of the cold beverage ingredient cartridge is in particular beneficial when the cold beverage ingredient cartridge is configured to dispense the cold beverage ingredient along the outside of the flow of carbonated water to combine both flows, carbonated water and ingredient, with a minimum of disturbance of said flows.

In an embodiment, the feed lance is adapted to engage the channel in the column of the hot beverage ingredient cartridge and/or the cold beverage ingredient cartridge, and the feed lance and the channel, when the feed lance engages the channel, form a continuous channel having a continuous cross section. In such an embodiment, the channel may comprise an upper section with a circumferential recess for receiving the feed lance such that the inside surface of the feed lance, i.e. the inside surface of the channel section of the feed lance, is substantially flush with the inside surface of the channel of the cartridge.

In an embodiment, the feed lance and the cold water conduit form a continuous channel having a continuous cross section, the continuous channel having an inlet port for the hot water conduit in a curved wall section. Thus, a substantially continuous channel is provided, i.e. a channel having a substantially continuous cross section, which allows for a laminar flow and thus is optimal for dispensing carbonated water.

In a further embodiment, the cross section of the cold water conduit is similar to the cross section of a section of the cold water supply line connecting the cold water conduit with a flow compensator.

In an embodiment, the hot water conduit has an internal restriction stream upwards of the port connecting the hot water conduit with the cold water conduit, wherein the restriction has a cross section that is smaller than the cross section of the hot water conduit downstream of the restriction and is smaller than the cross section of the port, in a plane perpendicular to the linear central axis of the hot water conduit, connecting the hot water conduit with the cold water conduit.

Thus, a flow of hot water, that is fed from the hot water conduit into the feed lance, passes through the section of the hot water conduit downstream of the restriction, through the port, the cold water conduit and the feed lance without contacting that section of the hot water conduit, the cold water conduit or the feed lance.

In a further preferred embodiment, the restriction has is an opening that extends in a plane perpendicular to the linear axis of the hot water conduit.

Therefore, by providing a restriction in the hot water conduit upstream of the port, the flow of hot water dispensed via the hot water conduit has a cross section that is smaller than the cross section of the conduit downstream of the restriction and smaller than the cross section (perpendicular to linear axis of the hot water conduit) of the port. In such an embodiment, the flow of hot water is essentially dispensed from the restriction, in that it does not contact the hot water conduit, or the cold water conduit or the feed lance, after it exits the restriction. Thus, it is the restriction that defines the cross section of the flow of hot water, and not the shape of the port.

It has been found that providing a restriction, the opening of the restriction preferably extending in a plane perpendicular to the linear axis of the hot water conduit, upwards of the port provides a linear flow of hot water and s thus beneficial in keeping the flow from coming into contact with the cold water conduit or the feed lance.

The cold water conduit and the hot water conduit of the water dispensing manifold are connected to the hot water source and the cold water source respectively via a water line, e.g. rigid and or flexible tubing.

In an embodiment, the preparation device further comprises a flow compensator, for optimizing the $CO_2$ content of the water, provided in the cold water supply line downstream of the carbonator. In an embodiment, the flow compensator is located directly upstream of the cold water conduit of the water dispensing manifold, in an embodiment is connected with an outflow opening directly to an inlet opening of the cold water conduit.

In an embodiment, the curved central axis of the cold water conduit has a radius of curvature that is larger than the diameter of the cross section of the cold water conduit. Provident the curvature with a large radius is advantageous for dispensing carbonated water in the form of a low turbulence and/or laminar flow.

In an embodiment, the feed lance, the cold water conduit and preferably the hot water conduit, are an integral component, preferably are an injection moulded component.

In an embodiment, the feed lance, the cold water conduit, and the hot water conduit are rigid components.

In an embodiment, the beverage preparation device comprises a water cooling tank filled with water and a refrigerating unit, preferably has its refrigerant coil disposed in the water within the water cooling tank.

In an embodiment, the carbonator is provided, preferably partly submerged in the water of the water cooling tank, the carbonator being connected with a plain water supply line and a carbonated water discharge line.

In an embodiment the invention relates to the preparation of a beverage or component of a beverage, in particular the preparation of milk froth. The invention is suitable in particular for the preparation of milk froth for a cappuccino.

In an embodiment, the device comprises a pressurisation device, e.g. a pump, to pressurise the hot water and the hot water is dispensed in the form of a jet into the cold water conduit and the feed lance.

According to the claimed invention, the hot water is dispensed from the hot water conduit into and through the feed lance and the cartridge, more in particular through the channel in the column of the cartridge, without contacting feed lance or cartridge. The flow of hot water is thus unimpeded and is dispensed directly in a vertical dispensing direction into a beverage container, e.g. a cup or glass, located below the holder, preferably located on a support.

By providing the flow of hot water dispensed from the hot water conduit, the impact of the water on the bottom of the beverage container is increased, increasing turbulence and thus promoting mixture of water and beverage ingredient.

Furthermore, the invention thus provides an improved way to provide an aerated beverage, e.g. frothed milk for a cappuccino. In an embodiment, the hot beverage ingredient cartridge holds milk or a milk concentrate that is dispensed form the hot beverage ingredient cartridge prior to or parallel to the flow of hot water. The impact of the jet of hot water onto the bottom of the beverage container and into the hot beverage ingredient dispensed, in addition to promoting mixture of the hot beverage ingredient with the hot water dispensed, generates a foam.

Thus, the invention allows for providing an aerated beverage, e.g. frothed milk for a cappuccino, the beverage being aerated in the beverage holder, i.e. outside the beverage preparation device or the beverage ingredient cartridge. In prior art preparation devices often a mixing chamber is provided, which introduces a component of the device that has to be cleaned after dispensing a beverage. A beverage preparation device according to the invention does not require such cleaning.

In an embodiment, in addition or as an alternative to dispensing the hot water as a jet, the hot ingredient cartridge is configured to provide an aerated beverage, e.g. frothed milk for a cappuccino.

In an embodiment, the hot beverage ingredient cartridge is configured to dispense the hot beverage ingredient, e.g. milk or milk concentrate, in one or more vertical flows, parallel to a flow of hot water dispensed via the water dispensing manifold. The configuration of the manifold according to the invention allows for providing the hot beverage ingredient cartridge with one or more dispensing apertures for dispensing the liquid hot beverage ingredient component closely adjacent the flow of water dispensed from the manifold. This allows for mixing of beverage ingredient and water in the beverage container, instead of in a mixing chamber of the preparation device or cartridge.

Furthermore, the configuration thus allows for creating the milk forth in the beverage container, and not in a mixing chamber of the dispensing device. Thus there is no need for cleaning the dispensing device after dispensing frothed milk.

It is submitted that the water dispense manifold, in particular in combination with the cartridge according to the invention, allows for dispensing multiple flows of beverage ingredient in a vertical direction and closely adjacent to a central flow of water, which furthermore allows for dispensing the ingredient and the water in the form of jets to thus provide high impact of the multiple flows closely adjacent to each other on the bottom of the beverage container to promote aeration of the beverage and create a foam, e.g. milk froth.

In an embodiment, the preparation device comprises pressure device for forcing the hot beverage ingredient or the cold beverage ingredient out of the reservoir of the respective hot beverage ingredient cartridge or cold beverage ingredient cartridge when held in the holder.

In a further embodiment, the cartridge is provided with dispensing apertures, for dispensing the beverage ingredient, sized for, in combination with the pressure provided by the preparation device, dispensing the beverage ingredient in the form of jets, i.e. pressurised flows.

In an embodiment, the preparation device is configured to guide a pressurized fluid, e.g. water or air, into the reservoir of the respective hot beverage ingredient or cold beverage ingredient cartridge to actively force the ingredient out of the reservoir.

In an alternative embodiment, the beverage ingredient cartridge, or part thereof, is flexible and/or the reservoir is configured as a pouch or bellow, and the preparation device is provided with device, e.g. a moving wall part of the holder, a wrench or piston like configuration, for reducing the volume of the reservoir by compressing the cartridge or part thereof.

In an embodiment, the preparation device further comprises:
  a pressurized gas source, preferably a pressurized air source, e.g. an air pump,
  a pressurization dome member having annular gas seal that is adapted to sealingly engage the top of the hot beverage ingredient cartridge or cold beverage ingredient cartridge, e.g. a top seal, e.g. at or near an upper rim of a circumferential wall of the hot beverage ingredient cartridge or the cold beverage cartridge, and
wherein the system is adapted to open, e.g. to peel, pierce, break, rupture and/or tear away at least part of a top seal, the reservoir at the top of the cartridge, and
wherein the pressurized gas source is connected to the pressurization dome member so as to allow feeding of pressurized gas beneath said dome member when the gas seal thereof sealingly engages the top of the respective cartridge and the reservoir has been opened, to allow entry of pressurized gas into the reservoir to pressurize said liquid ingredient therein to thereby assist the dispensing thereof from the reservoir via the one or more dispensing passages.

In an embodiment, the cartridge body at the top has an opening in communication with the reservoir, which opening is hermetically sealed by a top seal.

In an embodiment, the beverage preparation device, preferably the water feed assembly in cooperation with the holder, is adapted to open the hot beverage ingredient cartridge or the cold beverage ingredient cartridge when said cartridge is held in the holder, and is adapted to pierce the cartridge or a seal thereof, to at least partially peel and/or tear away and/or rupture a top seal hermetically sealing one or more inlet apertures of the reservoir and/or a bottom seal hermetically sealing one or more dispensing passage of the reservoir of the cartridge.

In an embodiment, the feed lance is adapted to connect to the channel of the of the column of the beverage ingredient cartridge, e.g. whilst piercing through a top seal of the cartridge, so that base liquid can be fed into the channel of the column.

In an embodiment, the beverage preparation device is provided with a water feed assembly configured to cooperate with the cartridge, more in particular is provided with a feed lance adapted to engage the cartridge, more in particular the column of the cartridge, and open the cartridge by pushing the column downward.

In an embodiment the downward movement of the pillar causes a top seal hermetically sealing one or more inlet apertures of the reservoir and/or a bottom seal hermitically sealing one or more dispensing passage of the reservoir of the cartridge to peel away and/or tear and/or rupture, and thus provide openings into and/or out of the reservoir for feeding water into the reservoir and/or through the channel, and for the beverage ingredient to be dispensed.

In an embodiment, the cartridges have a flexible section around the column, such that the column can be moved relative to the rest of the cartridge body, and the preparation device further comprises an operable displacement device which is adapted to produce a movement of the holder for the cartridge and the water dispensing manifold relative to each other, so that when the displacement device is operated the feed lance connects to the column, moves the column down relative to the top of the cartridge body, and thereby causes a bottom seal to rupture and/or peel away and/or tear away from dispensing aperture, thereby allowing dispensing of the liquid ingredient from the one or more passage outlet openings of the cartridge.

In a further embodiment, the reservoir of the cartridges is hermetically sealed with a top seal and the cartridges are provided with one or more piercing members that are arranged in the reservoir, and directed towards the inside of the top seal for piercing the top seal to allow for the introduction of pressurized gas, e.g. air, into the liquid ingredient reservoir, In such an embodiment, pressing the top seal inward, e.g. downward, causes said one or more piercing members to engage the top seal and locally rupture the top seal, thereby providing one or more openings that allow the introduction of pressurized gas into the reservoir in order to assist dispensing of said liquid ingredient.

In an embodiment, the hot beverage ingredient cartridge and/or the cold beverage ingredient cartridge, define one or more dispensing apertures for the beverage ingredient, and the beverage ingredient is dispensed directly from the cartridge into a beverage container provided below the holder.

In an embodiment of a system according to the invention further comprises:

a second hot beverage ingredient cartridge filled with a single serve portion of a hot beverage ingredient, wherein the second hot beverage ingredient cartridge comprises a cartridge body with a bottom and a top, the cartridge body delimiting a reservoir that is filled with the hot beverage ingredient, the cartridge body at the bottom has one or more dispensing passages in communication with the reservoir and adapted to dispense the ingredient from the cartridge at the bottom side thereof, and and wherein the beverage preparation device further comprises:
- a second holder configured to support the second hot beverage ingredient cartridge in a dispensing position at the dispensing location next to the holder configured to support the cold beverage ingredient cartridge and the hot beverage ingredient cartridge, and
- a second water feed assembly, located above the second holder, for directing hot water from the hot water source to the second hot beverage ingredient cartridge, which second water feed assembly is adapted to bring the hot water source in direct communication with the second hot beverage ingredient cartridge held in the second holder.

In a further embodiment of a system according to the invention,
- the hot beverage ingredient cartridge comprises an ingredient for dispensing milk, and preferably the beverage preparation device and/or the cartridge are adapted to froth the milk during the dispensing process,
- the second hot beverage ingredient cartridge comprises an ingredient for dispensing coffee, e.g. ground coffee or a coffee extract, and
- the second water feed assembly is adapted to bring the hot water source in direct communication with the reservoir of the second hot beverage ingredient cartridge, and to pressurise the hot beverage ingredient therein by said hot water and thereby assisting the dispensing thereof from the reservoir via one or more dispensing passages into a beverage container.

In an embodiment, the beverage preparation device comprises a first and second holder, for the hot beverage ingredient cartridge and the cold beverage ingredient cartridge and for the second hot beverage ingredient cartridge respectively, and the first and second water feed assembly are combined into a single water feed assembly, e.g. comprising a water dispensing manifold for providing hot and cold water at the first holder and a hot water feed lance for providing water at the second holder.

In a further embodiment, the single water feed assembly is configured as a reciprocating unit, for example vertically, driven by an operable displacement device, for example an excenter mechanism and an electric motor, to assist in opening the hot beverage ingredient cartridge and/or the cold beverage ingredient cartridge and/or the second hot beverage ingredient cartridge.

In an embodiment, the beverage preparation device comprises a first and a second holder and a two similar water feed assemblies, each comprising a water dispensing manifold according to the invention, one for each holder. In such an embodiment, the cold beverage ingredient cartridge and the second hot beverage ingredient cartridge can be held in each of the holders.

The invention furthermore provides a method for providing a hot and a cold beverage using a system according to the invention, the method comprising:

placing a cold beverage ingredient cartridge in the holder, placing a beverage container below the holder for receiving the cold beverage, dispensing the cold beverage ingredient from the reservoir of the cold beverage ingredient cartridge into the beverage container and dispensing cold carbonated water via the feed lance and the channel in the column of the cartridge into the beverage container, removing the beverage container holding the cold carbonated beverage from below the holder, removing the cold beverage cartridge from the holder, placing a hot beverage ingredient cartridge in the holder, placing a beverage container below the holder for receiving the hot beverage, dispensing the hot beverage ingredient from the reservoir of the hot beverage ingredient cartridge into the beverage container and dispensing hot water via the feed lance and the cartridge into the beverage container, and removing the beverage container holding the hot beverage from below the holder.

The invention furthermore provides a cold beverage ingredient cartridge for providing a system according to the invention.

The invention furthermore provides a hot beverage ingredient cartridge for providing a system according to the invention.

The invention furthermore provides a beverage preparation device for providing a system according to the invention.

When herein is referred to the cross section of the feed lance, the hot water conduit, the cold water conduit or the channel of the cartridge, it is to be understood that this refers to the cross section of the space defined by the channel section of the particular component, i.e. the part through which the water passes.

Also, when a cross section is considered smaller than another cross section, the smaller cross section has a smaller cross sectional area, and falls within the circumference of the larger cross section.

It is submitted that water supply lines, conduits and water dispense channels typically have a circular cross section, i.e. an elongated inner space having a substantially circular cross section. Thus, when the cross section of such a water supply line, conduit or channel is smaller than the cross section another water supply line, conduit or channel, the diameter and radius of that channel is also smaller.

In an embodiment according to the invention, the feed lance, the hot water conduit, the cold water conduit and the channel in the column of the cartridges al have a circular cross section.

Whilst primarily presented for illustrative purposes with reference to one or more of the figures, any of the technical features addressed below may be combined with any of the independent claims of this application either alone or in any other technically possible combination with one or more other technical features.

Advantageous embodiments of the drilling vessel according to the invention and the method according to the invention are disclosed in the sub claims and in the description, in which the invention is further illustrated and elucidated on the basis of a number of exemplary embodiments, of which some are shown in the schematic drawing. In the

BRIEF DESCRIPTION OF THE DRAWINGS

FIG. 8 shows a detailed partial side view in cross section of an exemplary embodiment cold beverage ingredient cartridge according to the invention;

FIG. 9 shows a detail of the cold beverage ingredient cartridge of FIG. 8;

FIG. 10 shows a schematic side view in cross section of a holder of a preparation device according to the invention;

FIG. 11 shows a schematic side view in cross section of an alternative holder of a preparation device according to the invention;

DETAILED DESCRIPTION OF THE DRAWINGS

Figure 1:
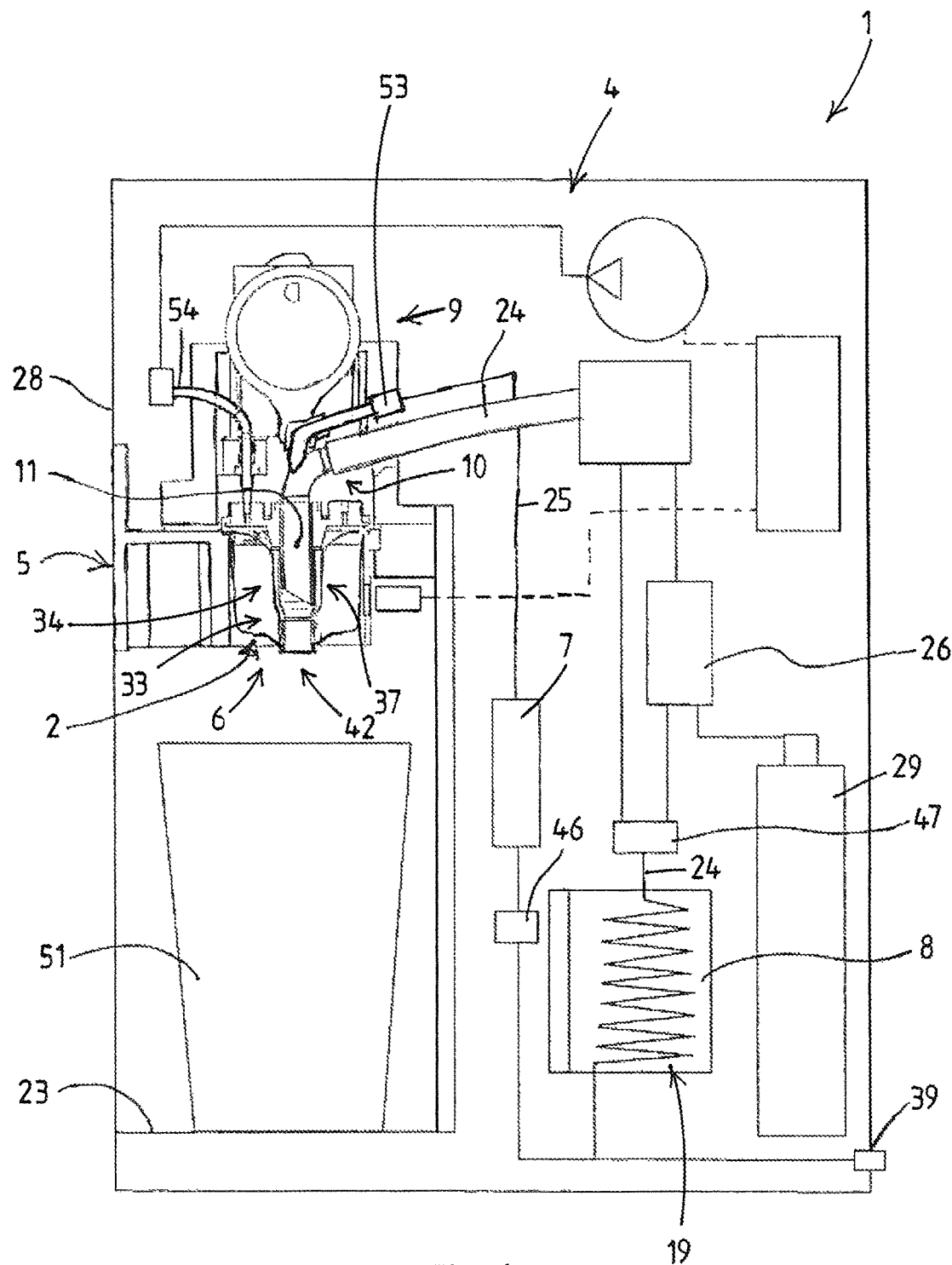
FIG. 1 schematically shows an exemplary embodiment of a system for the preparation of a liquid food product, e.g. a beverage according to the invention.

FIG. 1 schematically shows an exemplary embodiment of a system 1 for the preparation of a liquid food product, e.g. a beverage, according to the invention, the system comprising beverage preparation device 4 adapted to prepare hot and cold beverages and a disposable hot beverage ingredient cartridge and a cold beverage ingredient cartridge.

The preparation system further comprises a hot beverage ingredient cartridge filled with a single serve portion of a liquid ingredient to be mixed with hot water and a cold beverage ingredient cartridge filled with a single serve portion of a liquid ingredient to be mixed with cold water. In FIG. 1 the preparation device 4 is depicted with a cold beverage ingredient cartridge 2. Part of the cold beverage cartridge 2 is shown in cross section in FIG. 8 and FIG. 9. An exemplary embodiment of a hot beverage ingredient cartridge 2' is shown in cross section in FIG. 6 and FIG. 7.

According to the invention, the cartridges 2, 2' comprise a cartridge body 30 with a bottom 31 and a top 32, the body 30 delimiting a reservoir 33 that is filled with the liquid ingredient 34.

The cartridge body 30 at the bottom 31 has one or more dispensing passages 35 in communication with the reservoir 33. The dispensing passages 35 are adapted to dispense the liquid ingredient 34 at the bottom side of the cartridge 4, 4'. During transport, storage, etc., the one or more dispensing passages 35 are hermetically sealed by a bottom seal 36, shown in FIG. 6 and not shown in FIG. 7, to prevent the liquid ingredient from spilling from the beverage ingredient cartridge. The bottom seal is 36 perforated and/or partially removed prior dispensing the beverage ingredient, to allow the ingredient to exit the one or more dispensing passages.

The cartridge body 30 comprises a column 37 that has a bottom end 38 at the bottom 31 of the cartridge body and a top end 39 at the top 32 of the cartridge body, and has a channel 40 that extends through the column 37 from a channel inlet aperture 41 at the top end of the column to a channel outlet aperture 42 at the bottom end of the column.

Figure 4:
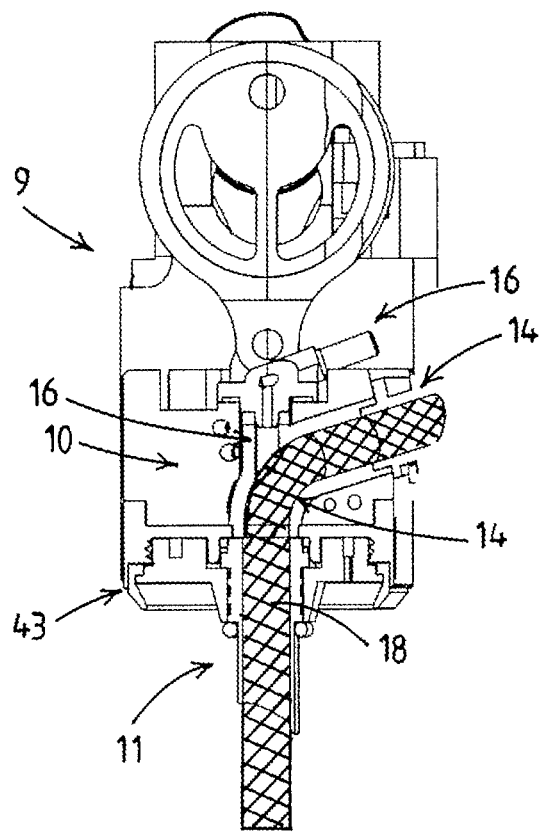
FIG. 4 shows a detailed partial side view in cross section of the preparation device of FIG. 1, dispensing a flow of cold water.
Figure 5:
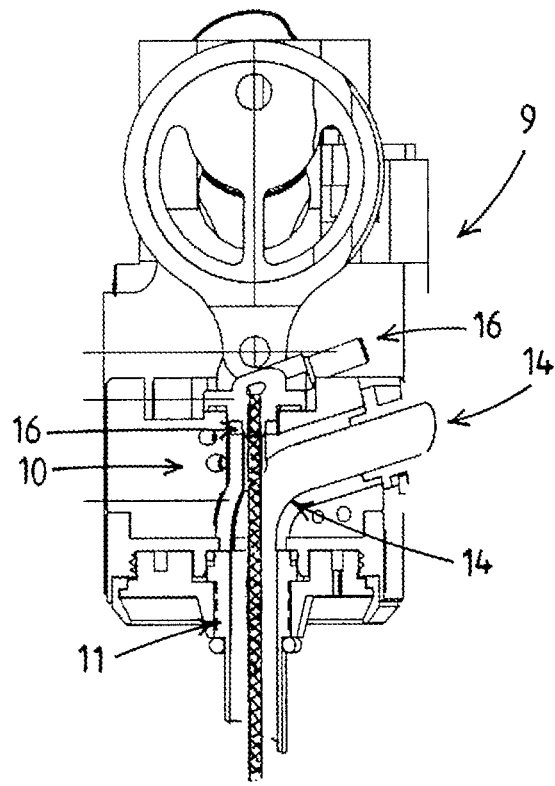
FIG. 5 shows a detailed partial side view in cross section of the preparation device of FIG. 1, dispensing a flow of hot water.

In the exemplary embodiment shown, the beverage preparation device 2 comprises a housing 28. The beverage preparation device 4 further comprises a water feed assembly 9, shown in more detail in FIGS. 4 and 5, and the disposable cartridge 2, which is shown in more detail in FIGS. 6 and 7.

The beverage preparation device comprises a holder 5, which holder is configured to support one of said hot and cold beverage cartridges 4,4' in a dispensing position with the channel 40 of the column 37 in an upright position, at a dispensing location 6 in the preparation device. A perspective view of a drawer type holder is shown in FIG. 11.

In the embodiment shown, the preparation device 2 comprises a holder in the form of a sliding drawer 58 for accommodating and retaining the cartridge 3 at a dispensing location 6 in the device. The dispensing location is directly above a support 23 for a beverage container 24, e.g. a glass.

In the embodiment shown, the drawer is supported for movement between a closed position shown, in which the beverage cartridge is held in the dispensing position, and an open position, in which the cartridge can be removed from the holder. In the embodiment shown, the holder, when moved between the closed position and the open position, is moved parallel to the plane of the drawing, i.e. to the left and right.

According to the invention, the beverage dispensing device 4 furthermore comprises a hot water source 7 and a cold water source 8.

According to the invention, the water feed assembly 9 comprises a water dispensing manifold 10, located above the holder 5, for directing the hot water from the hot water source 7 and the cold water from the cold water source 8 to the dispensing location 6. The water dispensing manifold is shown in more detail in FIGS. 2-5, and is shown in isolation in FIG. 12. The water dispensing manifold 10 comprises a feed lance 11, a cold water conduit 14, and a hot water conduit 16.

The feed lance 11 is embodied as a channel section 18 having a linear central axis 12 that extends in a vertical direction. The feed lance 11 at a lower end thereof has a dispensing opening 13 for dispensing the hot water and the cold water, provided via respectively the hot water conduit 16 and the cold water conduit 14 respectively, in a vertical dispensing direction.

In the embodiment shown, the feed lace is configured to engage, more in particular to be partially inserted into, the channel 40 of the column 37 of the cartridge. Furthermore, the lower end of the feed lance is slanted, such that the feed lance has a pointed end, to facilitate engaging the inlet opening of the column, and, optionally, to pierce a top seal covering said inlet opening.

In an embodiment, the feed lance may be configured to just engage the cartridge, and not be inserted into the channel. Also, in an embodiment according to the invention, the feed lance may be a two-part component, having a first section connected with the cold water conduit, and a second section downstream of the first section, which second section is adapted to engage the cartridge and is movable supported relative to the first section. Thus, the second section of the feed lance can be inserted into the channel of the column of the cartridge and/or move with the column of the cartridge between an initial position of the column and a second, lowered, dispensing position of the column. A two-part embodiment of the feed lance would allow for a main part of the water dispensing manifold, comprising the hot water conduit, the cold water conduit and the first section of the feed lance, to have a fixed position, while the feed lance may still be inserted into, and/or more with, the column of the cartridge.

It is submitted that the end lower end of the feed lance can be provided with many different forms without departing from the invention. In the embodiment shown, the end is slanted relative to the linear axis 12 of the conduit, i.e. the edge of the conduit that dispenses the dispensing opening extend sin a plane that is slanted relative to the linear axis of the conduit. In an alternative embodiment, the end may be blunt, i.e. extend in a plane perpendicular to the linear axis 12. In addition to, or as an alternative, the edge of the conduit defining the dispensing opening may have one or more piercing teeth, have a jigsaw shape, have a curvature, etc.

The cold water conduit 14 is connected, via a cold water supply line 24, to the cold water source 8. The cold water conduit 14 is embodied as a channel section having a curved central axis 15, the curvature of the central axis preferably being tangent to the vertical axis 12 of the channel section 18 of the feed lance 11, for guiding a flow of cold water into the vertical dispensing direction. Thus, the corner shaped channel section of the cold water conduit 14 guides cold water provided by the cold water supply line 24 into the vertically orientated channel section 18 of the feed lance 11.

The hot water conduit 16 ends at a lower end thereof in a port 20 provided in a top wall 21 of the cold water conduit 14 for dispensing a flow of hot water via the corner channel section into the feed lance 11, more in particular into the linear channel section 18 of the feed lance.

The hot water conduit 16 is connected, via a hot water supply line 25 to the hot water source 7. The hot water conduit 16 is embodied as a channel section 48 having a linear central axis 17 that extends parallel to, preferably coincides with, the central axis 12 of the channel section 18 of the feed lance 11.

It is noted that in the preferred embodiment shown, the hot water conduit 16 has an internal restriction 49 stream upwards of the port 20. Thus, the flow of hot water dispensed via the hot water conduit has a cross section that is smaller than the cross section of the conduit downstream of the restriction and, in the embodiment shown, smaller than the cross section (perpendicular to linear axis 17) of the port 20. In such an embodiment, the flow of hot water is essentially dispensed from the restriction, in that it does not contact the hot water conduit, or the cold water conduit or the feed lance, after it exits the restriction. Thus, it is the restriction that defines the cross section of the flow of hot water, and not the shape of the port 40.

It has been found that providing a restriction, the opening of the restriction preferably extending in a plane perpendicular to the linear axis of the hot water conduit, upwards of the port provides a linear flow of hot water and is thus beneficial in keeping the flow from coming into contact with the cold water conduit or the feed lance.

In the exemplary embodiment shown, the beverage dispensing device 4 comprises a carbonator 26, which carbonator is provided in the cold water supply line 24 for providing cold water with CO2. In the embodiment shown, the CO2 is provided form a CO2 bottle 29. It is submitted that alternatives for providing the cold water with CO2 by way of an in-line carbonator, as shown in FIG. 1, can also be sued without departing from the invention.

According to the invention, when the hot beverage ingredient cartridge 2' or the cold beverage ingredient cartridge 2 is supported in the dispensing position at the dispensing location 6, the feed lance 11 of the water feed assembly 9 is aligned with the channel 40 in the column 37 of the cartridge 2, 2' and the channel 40 of said hot and cold beverage ingredient cartridge forms a vertical extension of the feed lance 11, as is depicted in FIG. 1.

Furthermore, the hot water conduit 16, in particular the restriction in the hot water conduit, has a cross section that is smaller than the cross section of the feed lance 11 and is smaller than the cross section of the channel 40 in the column 37 of the hot beverage ingredient cartridge 2' and the cold beverage cartridge 2, such that a flow of hot water, that is fed from the hot water conduit 16 into the feed lance 11 via the port 20, passes through the feed lance and the cartridge without contacting the feed lance or the cartridge.

In other words, according to the invention, the hot water conduit 17 has a central axis 18 that extends parallel to, preferably coincides with, the central axis 12 of the channel section of the feed lance 11. Furthermore, the hot water channel section 48 of the hot water conduit 17 has a cross section that is smaller than the cross section of the dispense channel section 11. The hot water flow dispensed by the hot water conduit is confined by the channel section 48, in the particular embodiment shown the restriction 49, and thus has a cross section similar to the cross section of the hot water conduit, more in particular the restriction of the hot water conduit. Therefore, a flow of hot water that is fed from the hot water conduit into the feed lance, via the port 20, passes through the feed lance 11 without contacting the walls of the channel section of the feed lance. Thus, the heat transfer from the flow of hot water to these components of the water dispensing manifold is minimal, and the temperature of these components of the water dispensing manifold will not, or only be marginally raised, by the passing flow of hot water. Therefore, dispensing the flow of hot water does not significantly influence the temperature of a subsequent flow of cold water being dispensed through the water dispensing manifold.

In the embodiment shown, a water supply line 50 of the beverage preparation device 2 has a water inlet 39 to be connected to a water main. The water supply line 50 splits up into a cold water supply line 24, connected with the cold water source 8, and a hot water supply line 25, connected with the hot water source. The cold water supply line and the hot water supply line merge at the water dispensing manifold.

In addition, or as an alternative, to the water inlet 39, the beverage preparation device can be provided with a water reservoir.

In the embodiment shown, the hot water source 7 is provided in the form of a flow through water heater adapted to provide hot water to the feed lance 11. The flow thereof is controlled by hot water valve 46. Alternative hot water sources known from the prior art may also be sued, for example, in an alternative embodiment, the hot water source is embodied as a hot water supply tank, e.g. a water tank filled with water and a heating element.

Furthermore, in the embodiment shown, the cold water source 8 is provided in the form of a water line guided through a water chiller device. The flow through the cold water line is controlled by cold water valve 47.

The water chiller device comprises a water cooling tank 19, i.e. a tank filled with water and a refrigerating unit, preferably with a refrigerant coil disposed in the water within the water cooling tank. Thus, the water chiller device is configured to chill water passing through it via the water line, e.g. to a temperature between 2 and 10 Celsius.

In a preferred embodiment, the carbonator 26 is at least partially submerged in the water of a water cooling tank 19.

The water line 24 emerges from the water chiller device 8, and splits into a plain water line and a carbonated water line, the latter passing through the carbonator 26.

The carbonated water line comprises the carbonator 26, e.g. an inline or tankless carbonator. A CO2 bottle 29 is connected to the carbonator 26 so that the CO2 can be dissolved in the cold water and then fed to water dispensing manifold 10, more in particular into the cold water conduit of the water dispensing manifold.

The plain water supply line merges with the carbonated water supply line, after which the cold water supply line 24 is connected to the water dispensing manifold 10, more in particular to the cold water conduit 14 of the water dispensing manifold.

At a distance below the dispensing location 6 of the holder 5 the apparatus 2 has a standing place 23 for a beverage container 51, e.g. a mug, a drinking glass or other receptacle, for receiving the combined flows of water and liquid ingredient.

In an embodiment of the beverage preparation device according to the invention, the feed lance 11 is adapted to engage the channel 40 in the column 37 of the hot beverage ingredient cartridge 2' and/or the cold beverage ingredient cartridge 2. When the feed lance engages the channel, the feed lance and the channel form a continuous channel having a continuous cross section.

Figure 12:
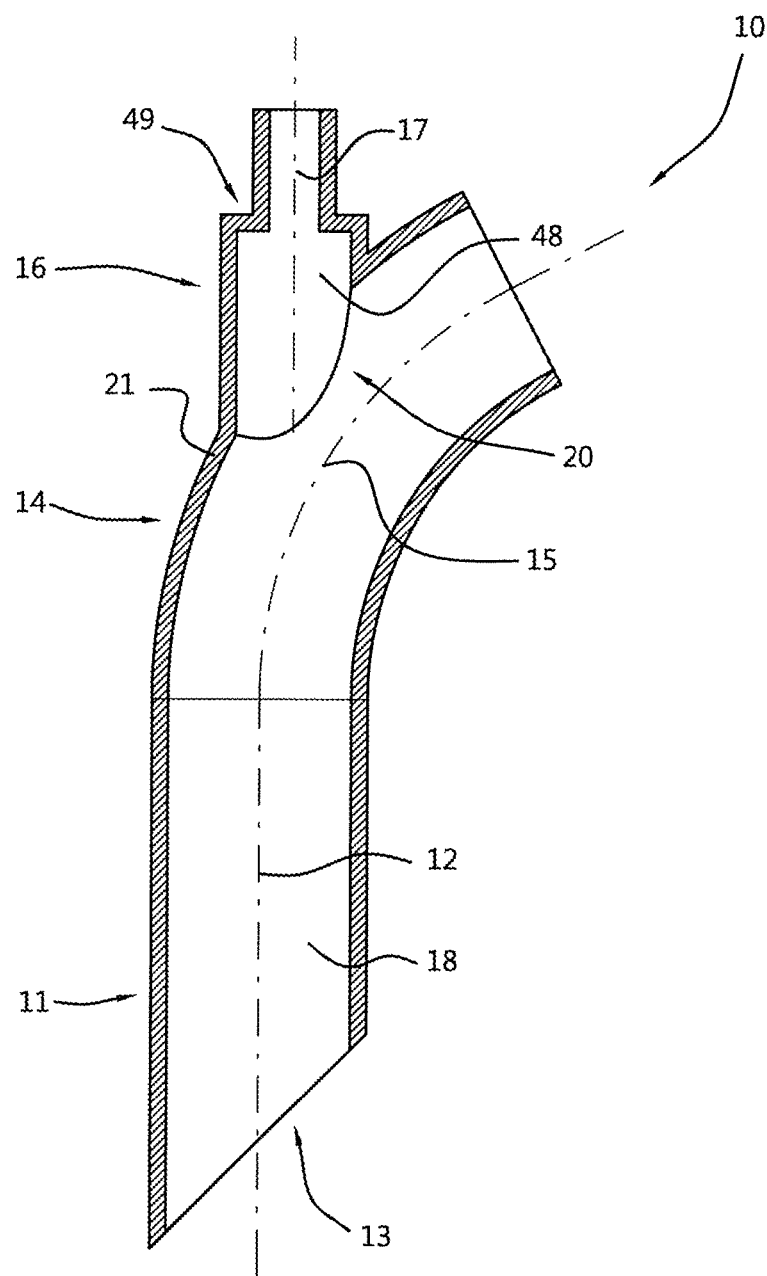
FIG. 12 shows a cross sectional side view of a water dispensing manifold of the beverage preparation device of FIG. 1 in isolation.

In the exemplary embodiment shown, see FIG. 12, the feed lance 11 and the cold water conduit 14 form a continuous channel having a continuous cross section. The wall of the continuous channel, when seen along the axis of the channel, i.e. in the flow direction of a flow of cold water being dispensed through the cold water conduit, defines a substantially continuous cross section, which allows for a laminar flow and thus is optimal for dispensing carbonated water.

Furthermore, in the embodiment shown, the curved central axis 15 of the cold water conduit 14 has a radius of curvature that is larger than the diameter of the cross section of the cold water conduit. Providing the cold water conduit with a large radius of curvature is beneficial when the cold water conduit is used for dispensing carbonated water, as is the case with the exemplary embodiment shown because the promotes a laminar flow which benefits the CO2 content of the water, more in particular it allows the water to hold the CO2 dissolved therein by the carbonator.

Also, in the embodiment shown, the feed lance, the cold water conduit, and the hot water conduit are rigid components. Thus, they do not move, or change trajectory or curvature during use, for example as a consequence of pressurised water being dispensed.

In an embodiment the invention relates to the preparation of a beverage or component of a beverage, in particular the preparation of milk froth. In an embodiment the preparation device is adapted for also dispensing coffee with milk, preferably frothed milk. For example, the holder and hot beverage ingredient of the preparation device are adapted to dispense milk and the food preparation device comprises a second holder for holding a second beverage ingredient cartridge for dispensing coffee, e.g. by brewing within the second cartridge or by dispensing a coffee concentrate form the second cartridge, at the dispensing location. Thus, the invention is suitable in for the preparation of milk froth for a cappuccino, more in particular is suitable for dispensing a cappuccino.

The beverage preparation device 2 comprises a pressurisation device, in the particular embodiment shown a pump 53, to pressurise the hot water dispensed via the hot water conduit 16. The pump can be used for dispensing the hot water in the form of a jet, the jet being directed though the cold water conduit and the feed lance. The jet of hot water is unhindered by restrictions and is dispensed directly in a vertical dispensing direction into a beverage container, e.g. a cup or glass, located below the holder, preferably located on a support. By thus providing the flow of hot water, the impact of the water on the bottom of the beverage container is increased, creating turbulence in the fluid in the beverage container, and thus promoting mixture of the dispensed water and beverage ingredient.

Figure 6:
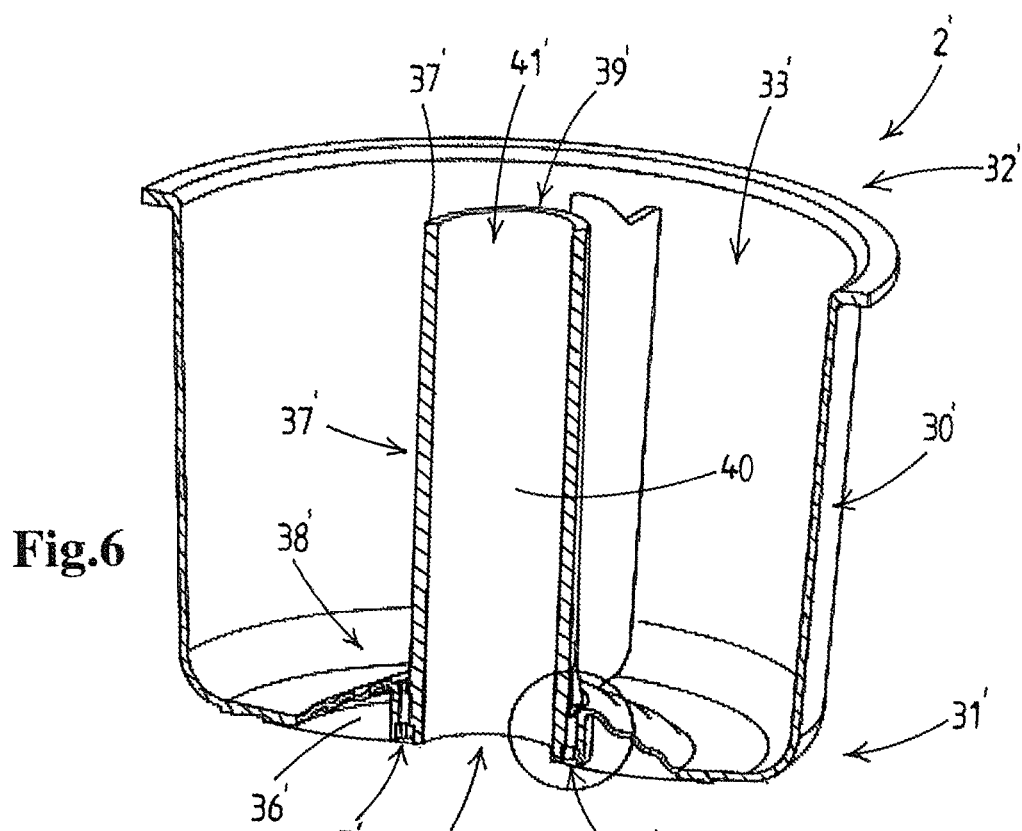
FIG. 6 shows a detailed partial side view in cross section of an exemplary embodiment hot beverage ingredient cartridge according to the invention.
Figure 7:
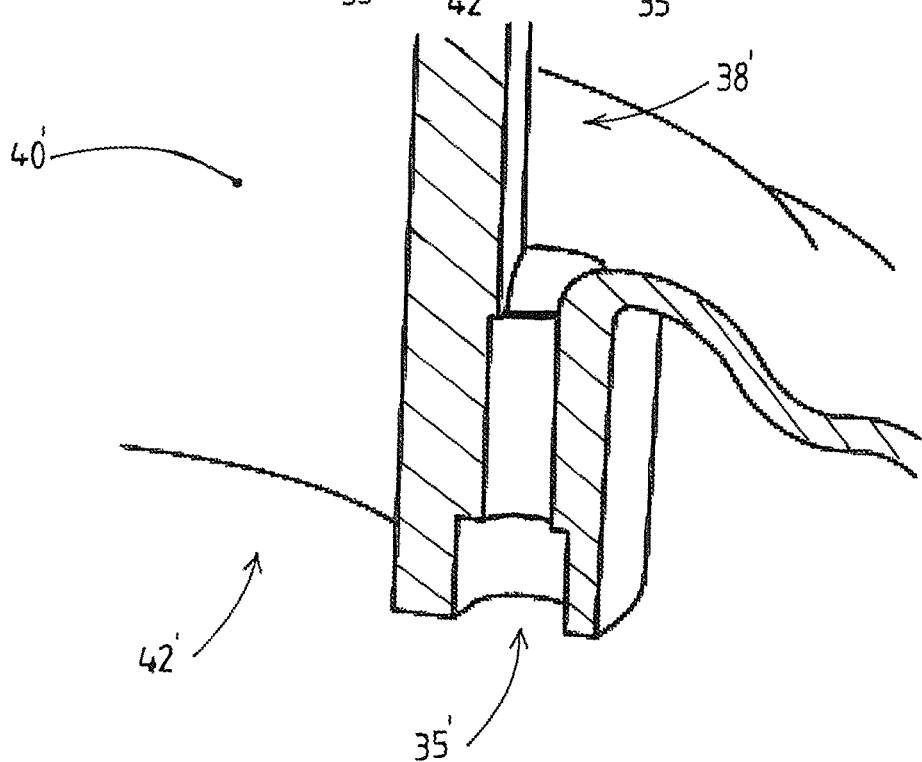
FIG. 7 shows a detail of the hot beverage ingredient cartridge of FIG. 7.

In addition to providing the hot water in the form of a jet, the system shown comprises a hot beverage ingredient cartridge, shown in FIGS. 6 and 7 that is adapted to dispense milk in one or more vertical flows, parallel to the jet hot water dispensed via the manifold. The configuration of the dispensing device, in particular the manifold allows for locating multiple streams of milk closely to the hot water flow, and thus impact closely together at the bottom of a beverage container located below the dispensing location. These close impacts provide a dynamic interaction, which optimally stimulates the generation of milk forth.

An exemplary embodiment of a cold beverage ingredient cartridge 2 is shown in part and in cross section in FIG. 8 and, in partial close up, in FIG. 9. In the particular embodiment shown, the cold beverage ingredient cartridge differs from the hot beverage ingredient cartridge 2' in the design of the dispensing passages 35 in the bottom of the reservoir.

The dispensing passages 35' of the hot beverage cartridge 2' are adapted for dispensing liquid beverage ingredient at high speed in a vertical direction, to thus generate a large impact of the dispensed flow of liquid ingredient onto the bottom of the beverage container and/or fluid already dispensed into the beverage container. Such a cartridge, more in particular a cartridge with such dispensing passages, is in particular beneficial for aerating the ingredient, for example for creating a foam, for example when dispensing concentrated milk for creating, in combination with the hot water dispensed via the hot water conduit, a foam for a cappuccino.

The exemplary cold beverage ingredient cartridge 2 shown in FIG. 8 and FIG. 9 comprises multiple dispensing passages 35 that have an inlet facing a wall 56. Thus, the liquid ingredient, when entering the dispensing passage, first impacts the wall surface, which reduces the speed of the flow of liquid ingredient. In addition, the dispensing passages 35, more in particular the outlets of the dispensing passages, are configured to direct the flow of liquid ingredient parallel to and alongside the flow of water being dispensed through the channel 40 of the column 37. In a preferred embodiment, the cross section of the feed lance is similar to the cross section of the channel in the column 37, such that the flow of cold water is confined by the walls of the channel, and thus flows closely adjacent the flow of liquid ingredient dispensed through the dispensing passages. Thus the liquid ingredient can adhere to the flow of cold water, forming a shroud on the outside of the flow of cold water. Such a cartridge is in particular beneficial when dispensing a soda beverage, e.g. carbonated cold water to be mixed with a syrup provided in the reservoir of the cartridge.

It is submitted that, to dispense water with a high CO2 content, carbonated water is preferably dispensed with a minimum of disturbance in the flow, thus at low pressure, and with a minimum of sharp angles and protrusions in the dispensing channel. The water dispensing manifold according to the invention provides such a channel, which furthermore in combination with the cold beverage ingredient cartridge allows for adding the liquid ingredient to the flow of cold water with a minimum of disturbance of the flow of cold water.

Thus, the invention provides an improved beverage preparation device for providing both cold carbonated beverages and hot beverages.

The exemplary embodiment of the beverage preparation device shown, furthermore comprises pressure device for forcing the hot beverage ingredient or the cold beverage ingredient out of the reservoir of the respective hot beverage ingredient cartridge or cold beverage ingredient cartridge when held in the holder.

Figure 2:
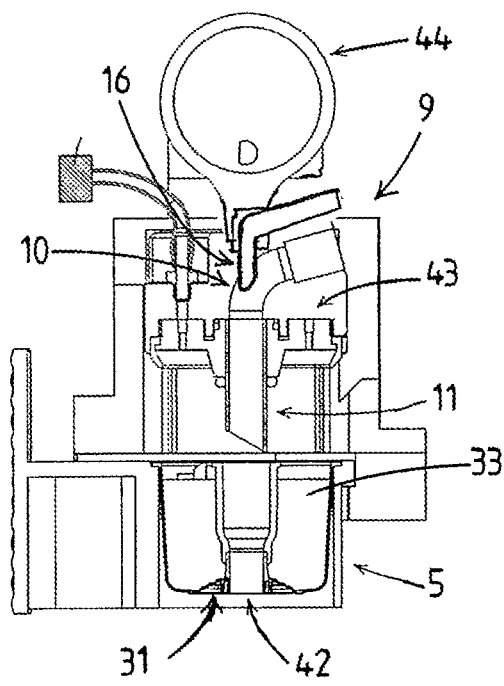
FIG. 2 shows a detailed partial side view in cross section of the preparation device of FIG. 1, in a first working position.
Figure 3:
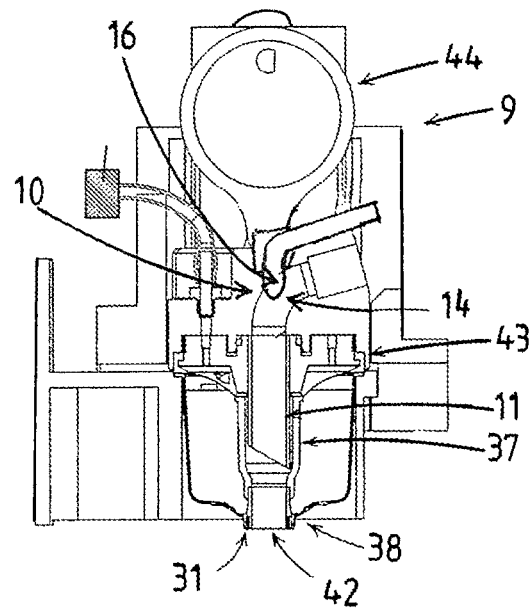
FIG. 3 shows the preparation device of FIG. 2, in a second working position.

The preparation device shown comprises a pressurized gas source, more in particular a pressurized air source embodied as an air pump 54, and a pressurization dome member 43 having annular gas seal that is adapted to sealingly engage the top of the hot beverage ingredient cartridge or cold beverage ingredient cartridge, e.g. a top seal, e.g. at or near an upper rim of a circumferential wall of the hot beverage ingredient cartridge or the cold beverage cartridge. FIG. 2 shows the water feed assembly 9, with pressurisation dome member 43, in a raised position, and FIG. 3 shows the water feed assembly in a lowered positon, in which the feed lance is inserted in the channel of the cartridge, and the dome member engages to top of the cartridge.

In an embodiment according to the invention, the system, is adapted to open, e.g. to peel, pierce, break, rupture and/or tear away at least part of a top seal, the reservoir at the top of the cartridge.

In the embodiment shown, the preparation device and the cartridge are adapted to cooperate, and thus open the reservoir at the top and at the bottom, more in particular to rupture a top seal sealing an opening of the reservoir at the top of the cartridge and peeling away a bottom seal sealing the dispensing passages at the bottom of the cartridge by pushing the column of the cartridge in a downward direction.

In the embodiment shown, the beverage ingredient cartridge, has a bottom with a flexible part extending around the column, enabling the column to be pushed in a downward direction relative to a circumferential walls of the cartridge. The cartridge is provided with a top seal and/or a bottom seal attached to the column and to another part of the cartridge, e.g. the circumferential wall of the cartridge, pushing down of the column may peel away and/or rupture the respective seal.

The reservoir of the cartridge is furthermore provided with piercing elements, that pierce the top seal from the inside when the column is pushed in a downward direction.

Thus, the preparation device and the cartridge are adapted to cooperate in opening the reservoir at the top and bottom, by moving the water feed assembly in a downward direction, the feed lance engaging the column and pushing it downward.

The pressurized gas source is connected to the pressurization dome member so as to allow feeding of pressurized gas beneath said dome member when the gas seal thereof sealingly engages the top of the respective cartridge and the reservoir has been opened, to allow entry of pressurized gas into the reservoir to pressurize said liquid ingredient therein to thereby assist the dispensing thereof from the reservoir via the one or more dispensing passages.

In an alternative embodiment, the preparation device is configured to guide a pressurized fluid in the form of a liquid, for example water, into the reservoir of the respective hot beverage ingredient or cold beverage ingredient cartridge to actively force the ingredient out of the reservoir.

In embodiments a dispensing cycle for a glass of beverage, e.g. of about 250 ml, will take between 15 and 30 seconds.

In an embodiment of a system according to the invention, the system furthermore comprises a second hot beverage ingredient cartridge filled with a single serve portion of a hot beverage ingredient and a second holder for holding the second cartridge adjacent the first holder at the dispensing location. The second hot beverage ingredient cartridge comprising a cartridge body with a bottom and a top, the body delimiting a reservoir that is filled with the hot beverage ingredient.

FIG. 10 shows a schematical side view in cross section of a first holder 105 and second holder 155 located adjacent each other, the left holder 105 being the holder configured for holding the hot beverage ingredient cartridge 102' and the cold beverage ingredient cartridge, the right holder being the second holder 155 for holding a second beverage ingredient cartridge, in FIG. 10 embodied as a pouch 57 type cartridge, e.g. a coffee pouch comprising a pouch of filter material holding a coffee granulate.

FIG. 10 furthermore schematically shows a water feed assembly 109, a cold water supply line 124, a hot water supply line 125, a cold water source 108 and a hot water source 107.

By providing the preparation device with a second holder two beverage ingredients can be dispensed in parallel, or one after the other, to provide a beverage comprising both ingredients. Thus, for example a cappuccino, comprising coffee and milk, can be provided.

The beverage preparation device 2 comprises a second holder 55, which second holder is configured to support a second hot beverage ingredient cartridge 56 in a dispensing position at the dispensing location next to the holder 5 configured to support the cold beverage ingredient cartridge and the hot beverage ingredient cartridge. The second holder 55 is depicted in the perspective view of the drawer 58 shown in FIG. 11.

In the embodiment shown, the second cart beverage cartridge is embodied similar to the cold beverage ingredient cartridge and the hot beverage ingredient cartridge shown, i.e. comprising a cartridge body defining a reservoir with a sealed top opening and sealed dispensing passages at the bottom of the cartridge.

The beverage preparation device further comprises a second water feed assembly, located above the second holder, for directing hot water from the hot water source to the second hot beverage ingredient cartridge, which second water feed assembly is adapted to bring the hot water source in direct communication with the second hot beverage ingredient cartridge held in the second holder.

The, the beverage preparation device can be used for providing a hot beverage and a cold beverage using a method according to the invention, wherein
- the hot beverage ingredient cartridge comprises an ingredient for dispensing milk, and preferably the beverage preparation device and/or the cartridge are adapted to froth the milk during the dispensing process,
- the second hot beverage ingredient cartridge comprises an ingredient for dispensing coffee, e.g. ground coffee or a coffee extract, and
- the second water feed assembly is adapted to bring the hot water source in direct communication with the reservoir of the second hot beverage ingredient cartridge, and to pressurise the hot beverage ingredient therein by said hot water and thereby assisting the dispensing thereof from the reservoir via one or more dispensing passages into a beverage container.

In an embodiment, the beverage preparation device comprises a first and second holder, for the hot beverage ingredient cartridge and the cold beverage ingredient cartridge and for the second hot beverage ingredient cartridge respectively, and the first and second water feed assembly are combined into a single water feed assembly, e.g. comprising a water dispensing manifold for providing hot and cold water at the first holder and a hot water lance for providing water at the second holder.

In a further embodiment, the single water feed assembly is configured as a reciprocating unit, for example vertically, driven by an operable displacement device, for example an excenter mechanism and an electric motor, to assist in opening the hot beverage ingredient cartridge and/or the cold beverage ingredient cartridge and/or the second hot beverage ingredient cartridge.

In an embodiment, the beverage preparation device comprises a first and a second holder and a two similar water feed assemblies, each comprising a water dispensing manifold according to the invention, one for each holder. In such an embodiment, the cold beverage ingredient cartridge and the second hot beverage ingredient cartridge can be held in each of the holders.

Figure 13:
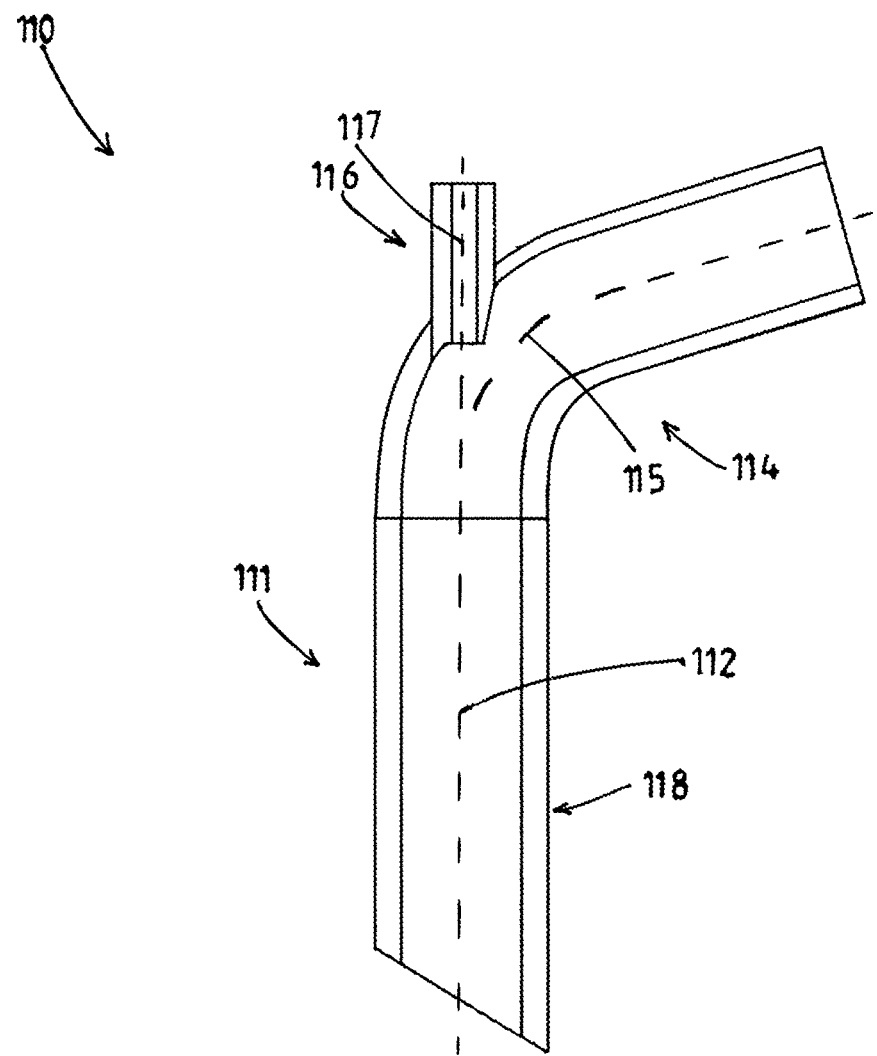
FIG. 13 shows a cross sectional side view of an alternative water dispensing manifold of a beverage preparation device according to the invention in isolation.

FIG. 13 depicts in isolation an alternative water dispensing manifold 110 of a beverage preparation device according to the invention. The water dispensing manifold 110 comprises a feed lance 111, a cold water conduit 114, and a hot water conduit 116. For dispensing a flow of hot water via the curved cold water conduit into the feed lance 111, more in particular into the linear channel section 118 of the feed lance, the hot water conduit 116 has a central axis 117 that coincides with the central axis 112 of the channel section of the feed lance 111. Furthermore, the hot water conduit 116 has a cross section that is smaller than the cross section of the channel section of the feed lance 111.

It is noted that a flow of hot water dispensed via the hot water conduit has a central axis that coincides with the central axis of the hot water conduit. Thus, in an embodiment in which the central axis of the hot water conduit coincides with the central axis of the channel section of the feed lance, the central axis of the flow of hot water dispensed via the hot water conduit has a central axis that coincides with the central axis of the channel section of the feed lance. Also, the cross section of the hot water conduit determines the cross section of the flow of hot water dispensed via the hot water conduit.

A flow of hot water that is fed from the hot water conduit 116 into the feed lance 111, passes through the feed lance without contacting the walls of the channel section of the feed lance. Therefore, heat transfer from the flow of hot water to the channel section of the feed lance 111 and the cold water conduit 114 is minimal, and the temperature of these components of the water dispensing manifold will not, or only be marginally raised, by the passing flow of hot water. Dispensing the flow of hot water does not significantly influence the temperature of a subsequent flow of cold water being dispensed through the water dispensing manifold.

REFERENCE SIGNS

01 System for the preparation of a liquid food product, e.g. a beverage
02 cold beverage ingredient cartridge
02'/102' hot beverage ingredient cartridge
03 single serve portion of a liquid ingredient to be mixed with water,
04 beverage preparation device, e.g. a beverage dispensing apparatus
05/105 holder for accommodating and retaining the cartridge
06 dispensing location in the device
07/107 hot water source
08/108 cold water source
09 water feed assembly
10 water dispensing manifold
11 feed lance
12 linear central axis feed lance
13 dispensing opening feed lance for dispensing hot water and cold water
14 cold water conduit for providing the feed lance with cold water
15 central axis cold water conduit
16 hot water conduit for providing the feed lance with hot water
17 central axis hot water conduit
18 channel section of feed lance
19 water cooling tank
20 port at lower end hot water conduit
21 top wall of the corner channel section
22 flow of hot water fed from the hot water conduit into the feed lance
23 support beverage container
24/124 cold water supply line
25/125 hot water supply line
26 carbonator
27 flow compensator
28 housing
29 CO2 bottle
30/30' cartridge body
31/31' bottom cartridge body
32/32' top cartridge body
33/33' reservoir cartridge
34 liquid ingredient
35/35' dispensing passages
36 bottom seal
37/37' column
38/38' bottom end column
39/39' top end column
40/40' channel in column
41/41' inlet aperture channel
42/42' outlet aperture column
43 dome member
44 displacement device water feed assembly
45 flow through heater
46 hot water valve
47 cold water valve 48 channel section hot water conduit
49 restriction
50 water supply line
51 beverage container
52 top seal
53 pressurisation device hot water
54 pressurisation device for reservoir cartridge
55/155 second holder
56 wall
57 second hot beverage ingredient cartridge
58 drawer
110 water dispensing manifold
111 feed lance
112 linear central axis feed lance
114 cold water conduit for providing the feed lance with cold water
115 central axis cold water conduit
116 hot water conduit for providing the feed lance with hot water
117 central axis hot water conduit
118 channel section of feed lance

The invention claimed is:

1. Beverage preparation system for the preparation of hot and cold beverages which system comprises:
   a) a hot beverage ingredient cartridge filled with a single serve portion of a liquid ingredient to be mixed with hot water and a cold beverage ingredient cartridge filled with a single serve portion of a liquid ingredient to be mixed with cold water, wherein for each cartridge:
   the cartridge comprises a cartridge body with a bottom and a top, the cartridge body delimiting a reservoir that is filled with the liquid ingredient,
   the cartridge body at the bottom has one or more dispensing passages in communication with the reservoir and adapted to dispense the liquid ingredient at the bottom side of the cartridge, and
   the cartridge body comprises a column that has a bottom end at the bottom of the cartridge body and a top end at the top of the cartridge body, and has a channel that extends through the column from a channel inlet aperture at the top end of the column to a channel outlet aperture at the bottom end of the column,
   b) a beverage preparation device adapted to prepare hot and cold beverages, the apparatus comprising:
   a holder configured to support one of said hot and cold beverage cartridges in a dispensing position with the channel of the column in an upright position, at a dispensing location in the preparation device;
   optionally, a support, preferably comprising a drip tray, for supporting a beverage container, in which the hot or cold beverage is to be received, below the holder;
   a hot water source;
   a cold water source;
   optionally, a carbonator;
   a water feed assembly comprising a water dispensing manifold, located above the holder, for directing the hot water from the hot water source and the cold water from the cold water source to the dispensing location, wherein the water dispensing manifold comprises:
   a feed lance, which feed lance is embodied as a channel section having a linear central axis that extends in a vertical direction, and which feed lance at a lower end thereof has a dispensing opening for dispensing the hot water and the cold water in a vertical dispensing direction;
   a cold water conduit, which cold water conduit is, via a cold water supply line, connected to the cold water source, and which cold water conduit is embodied as a channel section having a curved central axis, the curvature of the central axis preferably being tangent to the central linear axis of the channel section of the feed lance, for guiding a flow of cold water into the vertical dispensing direction;
   a hot water conduit, connected via a hot water supply line to the hot water source, which hot water conduit is embodied as a channel section having a linear central axis that extends parallel to, preferably coincides with, the linear central axis of the channel section of the feed lance,
   wherein the hot water conduit ends, at a lower end thereof, in a port provided in a wall of the cold water conduit for dispensing a flow of hot water via the cold water conduit into the feed lance,
   wherein, when the hot beverage ingredient cartridge or the cold beverage ingredient cartridge is supported in the dispensing position, the feed lance of the water feed assembly is aligned with the channel in the column of the cartridge, and the channel of said hot and cold beverage ingredient cartridge forms a vertical extension of the feed lance, and
   wherein the hot water conduit has a cross section that is smaller than the cross section of the feed lance and preferably is smaller than the cross section of the channel in the column of the hot beverage ingredient cartridge, such that a flow of hot water, that is fed from the hot water conduit into the feed lance via the port, passes through part of the cold water conduit and through the feed lance without contacting the cold water conduit or the feed lance and preferably passes through the hot beverage cartridge without contacting the cartridge.

2. System according to claim 1, wherein the device comprises a pressurisation device to pressurise the hot water and the hot water is dispensed in the form of a jet into the cold water conduit and the feed lance.

3. System according to claim 1, wherein the cross section of a downstream part the channel in the column of the beverage ingredient cartridges is identical to the cross section of the dispense channel section.

4. System according to claim 1, wherein the feed lance is adapted to engage the channel in the column of the hot beverage ingredient cartridge and/or the cold beverage ingredient cartridge, and the feed lance and the channel, when the feed lance engages the channel, form a continuous channel having a continuous cross section.

5. System according to claim 1, wherein the feed lance and the cold water conduit form a continuous channel having a continuous cross section.

6. System according to claim 1, wherein the cartridge body at the top has an opening in communication with the reservoir, which opening is hermetically sealed by a top seal.

7. System according to claim 1, wherein the water feed assembly in cooperation with the holder is adapted to open the hot beverage ingredient cartridge or the cold beverage ingredient cartridge when said cartridge is held in the holder, and is adapted to pierce the cartridge or a seal thereof, to at least partially peel away and/or tear away and/or rupture a top seal hermetically sealing one or more inlet apertures of the reservoir and/or a bottom seal hermetically sealing one or more dispensing passage of the reservoir of the cartridge.

8. System according to claim 1, wherein the hot beverage ingredient cartridge and/or the cold beverage ingredient cartridge define one or more dispensing apertures for the beverage ingredient, and the beverage ingredient is dispensed directly from the cartridge into a beverage container provided below the holder.

9. System according to claim 1, wherein the preparation device forces the hot beverage ingredient or the cold beverage ingredient out of the reservoir of the respective hot beverage ingredient cartridge or cold beverage ingredient cartridge when held in the holder, and is configured to guide a pressurized fluid into the reservoir of the respective hot beverage ingredient or cold beverage ingredient cartridge to actively force the ingredient out of the reservoir.

10. System according to claim 9, wherein the preparation device further comprises:
   a pressurized gas source, preferably a pressurized air source,
   a pressurization dome member having annular gas seal that is adapted to engage the top of the hot beverage ingredient cartridge or cold beverage ingredient cartridge, and
   wherein the system is adapted to open, e.g. to pierce, peel away, rupture and/or tear away at least part of a top seal, the reservoir at the top of the cartridge, and
   wherein the pressurized gas source is connected to the pressurization dome member so as to allow feeding of pressurized gas beneath said dome member when the gas seal thereof engages the top of the respective cartridge and the reservoir has been opened, to allow entry of pressurized gas into the reservoir to pressurize said liquid ingredient therein to thereby assist the dispensing thereof from the reservoir via the one or more dispensing passages.

11. System according to claim 1, wherein the feed lance, the cold water conduit, are integral components.

12. System according to claim 1, wherein the feed lance, the cold water conduit, and the hot water conduit are rigid components.

13. System according to claim 1, wherein the central axis of the cold water conduit has a radius of curvature that is larger than the diameter of the cross section of the cold water conduit.

14. System according to claim 1, wherein the dispensing device further comprises a flow compensator, provided in the cold water supply line downstream of the carbonator.

15. System according to claim 1, further comprising:
   a second hot beverage ingredient cartridge filled with a single serve portion of a hot beverage ingredient, wherein
   the second hot beverage ingredient cartridge comprises a cartridge body with a bottom and a top, the cartridge body delimiting a reservoir that is filled with the hot beverage ingredient,
   the cartridge body at the bottom has one or more dispensing passages in communication with the reservoir and adapted to dispense the ingredient from the cartridge at the bottom side thereof, and
   wherein the beverage preparation device further comprises:
   a second holder configured to support the second hot beverage ingredient cartridge in a dispensing position at the dispensing location next to the holder configured to support the cold beverage ingredient cartridge and the hot beverage ingredient cartridge, and
   a second water feed assembly, located above the second holder, for directing hot water from the hot water source to the second hot beverage ingredient cartridge, which second water feed assembly is adapted to bring the hot water source in direct communication with the second hot beverage ingredient cartridge held in the second holder.

16. System according to claim 15, wherein:
   the hot beverage ingredient cartridge comprises an ingredient for dispensing milk,
   the second hot beverage ingredient cartridge comprises an ingredient for dispensing coffee, and
   the second water feed assembly is adapted to bring the hot water source in direct communication with the reservoir of the second hot beverage ingredient cartridge, and to pressurise the hot beverage ingredient therein by said hot water and thereby assisting the dispensing thereof from the reservoir via one or more dispensing passages into a beverage container.

17. Cold beverage ingredient cartridge for providing a system according to claim 1.

18. Hot beverage ingredient cartridge for providing a system according to claim 1.

19. Beverage preparation device for providing a system according to claim 1.

20. Method for providing a hot and a cold beverage using a system according to claim 1, the method comprising:
   placing a cold beverage ingredient cartridge in the holder,
   placing a beverage container below the holder for receiving the cold beverage,
   dispensing the cold beverage ingredient from the reservoir of the cold beverage ingredient cartridge into the beverage container and dispensing cold carbonated water, via the feed lance and the channel in the column of the cartridge into the beverage container,
   removing the beverage container holding the cold carbonated beverage from below the holder,
   removing the cold beverage cartridge from the holder,
   placing a hot beverage ingredient cartridge in the holder,
   placing a beverage container below the holder for receiving the hot beverage,
   dispensing the hot beverage ingredient from the reservoir of the hot beverage ingredient cartridge into the beverage container and dispensing hot water via the feed lance and the cartridge into the beverage container, and
   removing the beverage container holding the hot beverage from below the holder.

* * * * *